United States Patent [19]

Schaeffer et al.

[11] 4,190,208
[45] Feb. 26, 1980

[54] PROCESSOR AND CUTTER DISC

[75] Inventors: Robert L. Schaeffer, LeRoy; Bhim S. Madan, Brockport, both of N.Y.

[73] Assignee: General Electric Company, New York, N.Y.

[21] Appl. No.: 955,348

[22] Filed: Oct. 27, 1978

[51] Int. Cl.$^2$ ............................................. B02C 18/18
[52] U.S. Cl. .................................... 241/92; 241/282.2
[58] Field of Search ............................... 366/314–316; 83/592; 144/118, 176; 241/277, 278 R, 282.1, 282.2, 199.12, 92

[56] References Cited

U.S. PATENT DOCUMENTS

| 243,139 | 6/1881 | Kimmel | 241/92 |
|---|---|---|---|
| 1,964,437 | 6/1934 | Klein | 241/92 |
| 2,678,073 | 5/1954 | De Nardis | 241/92 |
| 3,032,086 | 5/1962 | Daugherty | 83/592 X |
| 3,085,607 | 4/1963 | Schottle | 241/92 |

FOREIGN PATENT DOCUMENTS 2364013 5/1978 France ........................................ 241/92

*Primary Examiner*—Mark Rosenbaum
*Attorney, Agent, or Firm*—John F. Cullen; George R. Powers; Leonard J. Platt

[57] ABSTRACT

In a food processor with a power base and a lid-covered bowl, a feed chute through the lid empties onto a cutting disc rotated by a shaft extending into and terminating in the bowl. To this general combination an improvement in the disc structure is provided comprising a peripheral flange around the disc edge extending upwardly adjacent the bowl inner surface, with a single substantially rectangular locking bevel-edged opening through the disc and flange on one side only of the disc's center, the opening terminating short of and adjacent the disc center. A narrow slot is provided centrally of the opening to extend across the disc center and a depending hub on the disc at its center crosses the slot to receive the shaft. A removable beveled-edged cutter blade insert has a tab matching the slot and the insert is radially slidable into the opening and the slot to contact the hub. A stepped sleeve on the tab vertically locates the insert on the shaft and the insert has a scoop behind the cutter which is beveled to funnel cut food down into the bowl. The entire device is plastic with a metallic cutter blade and the arrangement is such that the disc is totally carried by the insert which is supported by the hub/tab contact and is vertically restrained by the locked edges while being radially restrained by the shaft. The disc is further fixedly spaced from the underside of the lid by the stepped sleeve for clearance from the lid providing a single disc with multiple capabilities by using different shaped inserts.

6 Claims, 8 Drawing Figures

U.S. Patent Feb. 26, 1980 Sheet 1 of 2 4,190,208
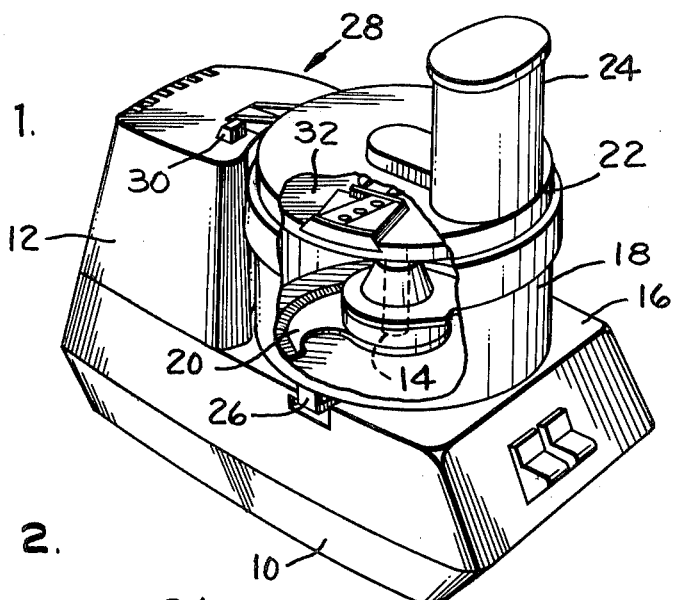
Fig. 1.
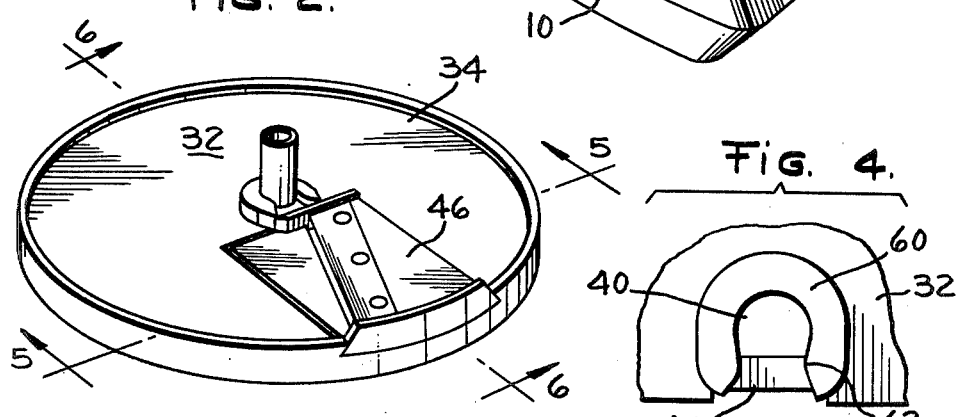
Fig. 2.
Fig. 4.
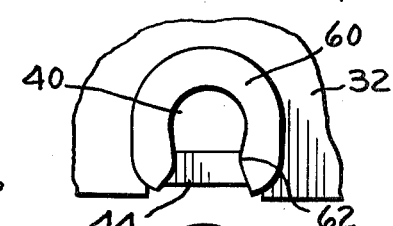
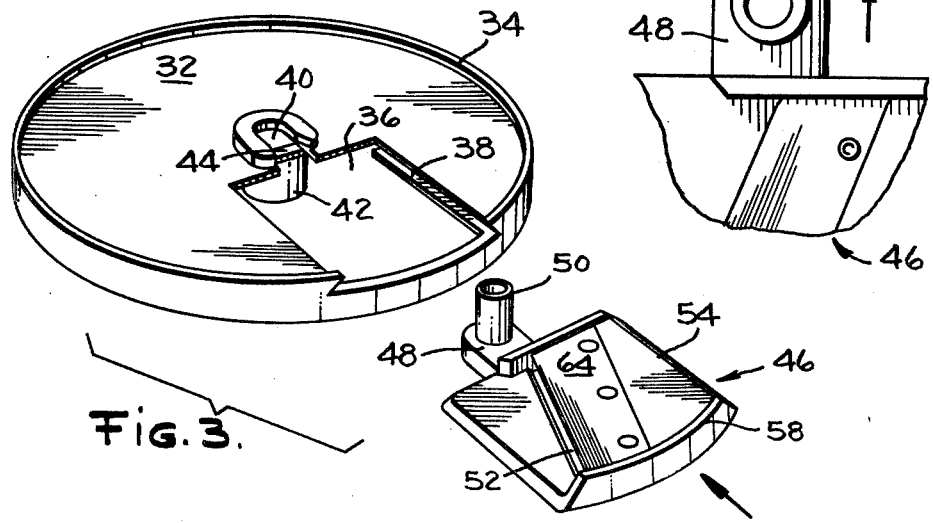
Fig. 3.

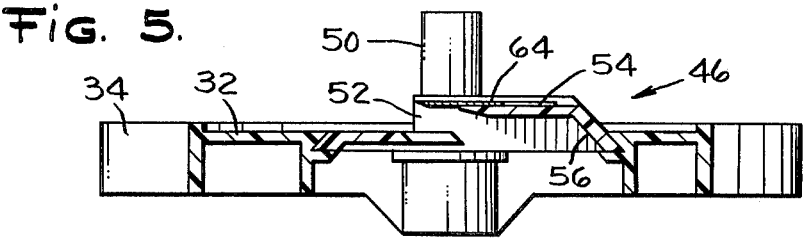
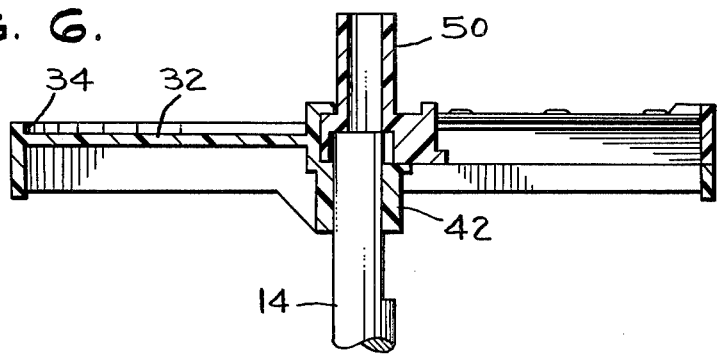
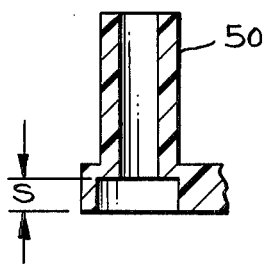
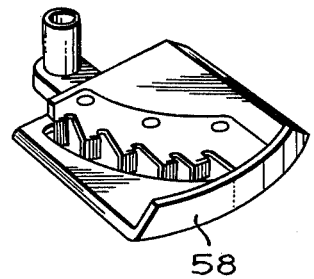

PROCESSOR AND CUTTER DISC

BACKGROUND OF THE INVENTION

1. Field of the Invention

The invention relates to a food processor having a power base with a lid-covered bowl thereon and a feed chute through the lid to a cutting disc rotated by a shaft extending into the bowl. To this general arrangement an improved disc construction is provided whereby various inserts may be used in the disc to provide multiple cutting capabilities with the insert and disc cooperating to provide fixed restraint in all necessary directions and provide an essentially two-piece disc for many various cutting functions.

2. Description of the Prior Art

It is known to use food processors, a device fitting in the speed range between blenders and mixers, as a multi-purpose kitchen apparatus that uses generally multiple interchangeable rotary tools such as blades, knives, cutting and rasping discs, and various attachments for blending, mixing, grating, grinding, chopping, slicing, whipping, and other operations in a short time. Such processors have become a commonly used kitchen appliance. They usually comprise a power base with a lid-covered bowl supporting portion and a vertically driven shaft extending into the bowl that carries the cutters in the base of the bowl or various forms of slicing discs that operate immediately below the lid and receive food from a feed chute through the lid. The lid is generally interlocked with the motor circuit to inactivate the processor when the lid is removed and the sharp cutting means or discs are exposed. Such food processors are generally well known and various forms of discs with knives, rasps, interchangeable cutters, have been known in one form or another. Typically, a food slicer employing an interchangeable cutter is shown in U.S. Pat. No. 3,085,607 upon which the instant invention provides an improvement.

An object of the invention is to provide a food processor of the general known type with an improved disc that may take any one of a number of inserts to provide multiple cutting capabilities.

Another object is to provide such a processor which uses a simple one-part disc and one-part insert by which many cutting operations are obtainable by the use of the proper insert in the two-piece disc structure.

SUMMARY OF THE INVENTION

Briefly described, the invention is directed to a food processor having a power base and lid-covered bowl thereon with a feed chute through the lid to a cutting disc rotated by a shaft extending into and terminating in the bowl. To this known combination, an improvement is provided in the cutting disc that comprises a peripheral flange on the disc extending upwardly adjacent the bowl inner surface with the disc having a single substantially rectangular beveledged opening through the disc and flange with the opening being on only one side of the disc center and ending short of and adjacent the center. Connecting the opening with the center is a narrow slot centrally of the opening that extends across the disc center. The disc is provided with a depending hub at its center a portion of which crosses the slot to receive the driven shaft. A removable bevel-edged cutter insert of substantially square section and having a tab matching the slot is radially slidable into the opening and into the slot to contact the hub to help support the disc while a stepped sleeve on the tab vertically locates the insert on the shaft. The insert has an extended aperture cutting edge raised above the disc surface and a scope around the cutter both arranged to deflect the cut food down into the bowl with the raised portion having a rim also continuous with and extending above the upwardly directed flange to form a guide into the cutting aperture. The entire arrangement is disposed so that the disc is totally carried by the insert which in turn is supported by the hub and tab contact to level the disc while the disc is vertically restrained by the beveled edges and radially restrained by it mounting on the shaft. The distance between the disc and lid is fixed by the stepped sleeve so that the disc provides multiple cutting capabilities with the different inserts. Thus, the main object of the invention is to provide a food processor with a multiple cutting capability disc that uses different inserts with different shaped cutters.

BRIEF DESCRIPTION OF THE DRAWINGS

FIG. 1 is a perspective view, partially in section, showing the processor arrangement;

FIG. 2 is a perspective view of a disc with the insert in position;

FIG. 3 is an exploded view, similar to FIG. 2, showing the insert removed;

FIG. 4 is a partial exploded top view of FIG. 3 showing how the insert is installed on the disc;

FIG. 5 is a cross-sectional view on line 5—5 of FIG. 2;

FIG. 6 is a cross-sectional view on line 6—6 of FIG. 2;

FIG. 7 is a partial cross-sectional view of the stepped sleeve portion on the insert tab; and FIG. 8 is a perspective view of a different form of cutting insert.

DESCRIPTION OF THE PREFERRED EMBODIMENT

Referring to FIG. 1 there is shown a food processor including a basic blender-type power base 10 which is preferably L-shaped having an upstanding motor containing housing unit 12 which has a suitable motor such as a low cost series motor driving a power shaft 14 by any suitable link between the power unit and shaft as well known in the art. Any power base 10 will suffice but the L-shaped is preferred since it presents an overall low profile desirable in a kitchen appliance. Disposed on the bowl supporting portion 16 of the base is a removable bowl 18 with its separate removable cutter mechanism 20 well known in the art. These cutters perform a chopping operation on foods. Bowl 18 is a relatively large bowl having a removable lid 22 with an integral feed chute 24 by which food is introduced to the bowl. The bowl is locked in position on the base by suitable lugs 26 by rotating it into position on supporting portion 16. Thus, the bowl and cutter 20 are supported on portion 16 with the cutter being driven from motor unit 12 in the base 10 generally at a given speed. To prevent access to the moving cutter mechanism 20 in the bowl, the lid is secured to the bowl 18 by an interlocking mechanism generally indicated at 28 and releasably by knob 30 as detailed in U.S. Pat. No. 4,111,372 of common assignment.

For multiple food processing steps, it is known to provide one or more cutting discs 32 that may contain rasping or grating or slicing cutters as shown in FIG. 5 and 6 of U.S. Pat. No. 3,892,365. Such disc cutters are used separately from chopping cutters 20 and operate just below the lid adjacent feeding chute 24 for performing separate operations into the bowl. Generally, additional discs are stored separately and are used separately although it is known to use insertable cutters by providing a longitudinal cutout completely across the disc and insert cutters of different configuration as shown in U.S. Pat. No. 3,085,607 on which the present invention improves by providing an insertable cutter for the disc structure which simplifies the disc structure, provides better support in the necessary direction, is inexpensive, being completely plastic except for the cutter blade itself, and accurately locates the individual cutter very close to the underside of the lid to minimize the last bit of food from the chute being carried around on the top of the lid. Thus, the design provides a maximum utility since many different slice thicknesses, shred sizes, etc. are available at a minimum cost and with a minimum of storage space requiring only a small box to store a suitable number of cutter inserts.

Referring to FIG. 2, there is shown the improved cutting disc that is designed to have a peripheral flange 34 completely around the disc and extending upwardly adjacent the inner surface of bowl 18 so that it nests closely against the bowl. For cutting, there is provided a single opening 36 that is substantially rectangular and has inwardly directed locking beveled edges 38 along each side with the opening 36 completely through the disc and peripheral flange 34 as seen in FIG. 3. The opening is disposed to terminate short of and adjacent the disc center with only a narrow slot 40 centrally of the opening meaning the slot is substantially equidistant from each side of opening 36 and is directed radially inward to extend across the disc center. For support, the disc is provided with an integrally molded depending hub 42 at its center with part of the hub 44 crossing the slot 40 for a purpose to be described and with the hub sized to receive shaft 14 as seen in FIG. 6. For cutting, cooperating with the disc 32 is a removable locking bevel edged cutter insert 46 which is sized to fit opening 36 and has a tab 48 that matches slot 40 to fit therein with the tab radially slidable into the opening end of the slot to contact the hub 42 at crossing portion 44 as the insert is installed from the position of FIG. 3 to FIG. 2 or slid upward as shown in FIG. 4. For locating the vertical position of disc 32, the insert is provided with a stepped sleeve 50 that may be solid or hollow as shown in FIG. 7, the sleeve being disposed vertically on the end of tab 48 with the sleeve being cut with a step S dimension that can be varied and that vertically locates the insert 46 on shaft 14. The beveled edges of the insert and the matching opening lock the insert in the opening against vertical movement and the fitting of sleeve 50 over the shaft end holds the insert in position against any radial movement outwardly of the disc. It will be apparent that the entire weight of disc 32 is supported and carried by insert 46 in the construction shown since, as seen in FIG. 6, except for the sleeve 50 abutting and carried on the end of shaft 14, the disc would drop down on the shaft since it would extend through hub 42.

Referring to FIGS. 3 and 5, the construction of the individual insert can be seen where the insert 46 has a spanning aperture 52 that extends along a raised portion above the disc surface to form a scoop 54 behind the cutting surface 52. The back of the scoop has a second bevel 56 to funnel all cut food down into the bowl below. For guiding the food cut by the rotating disc, the individual insert along its raised scoop portion, has a rim 58 along its peripheral edge which is contiguous with and extends above the flange 34 forming a guide into and through the aperture 52 also assisting in funneling the food into the bowl.

While the support of the entire disc and insert is achieved by sleeve 50 resting on the top of shaft 14, additional holding may be obtained by providing a U-shaped collar 60 around the disc at its slot 40 with the U-opening toward the insert and formed with pinched portion 62 to frictionally squeeze the tab and assist in holding the insert in the disc. This also provides a snap-action sound to tell the user the insert is in position.

The device is inexpensive with all of the parts, excepting cutter blade 54, being formed of plastic and the cutter blade is preferably metallic secured to the scoop. FIG. 8 illustrates a different cutter blade used to provide long thin strips and the processing disc would normally be supplied with numerous desired cutters of different shapes similar to FIG. 3 and 8. The general arrangement thus provides a twopart disc insert that, with various inserts, provides a single disc with multiple cutting capabilities and the structure is such that the disc is totally carried by the insert which in turn is supported by the hub/tab contact; the disc is vertically restrained by the locked bevel edges; and different insert discs are radially restrained by the shaft connection to sleeve 50 with the sleeve providing a constant relationship between the cutting edge and the bottom of the feed chute 24 to always maintain the same distance from the top of the shaft 14 and the bottom of feed chute 24 regardless of the thickness of the slice.

While we have hereinbefore shown a preferred form of the invention, obvious equivalent variations are possible in light of the above teachings. It is therefore to be understood that, within the scope of the appended claims, the invention may be practised otherwise than as specifically described, and the claims are intended to cover such equivalent variations.

We claim:

1. In a food processor having a power base and lid-covered bowl with an inner surface, a feed chute through the lid to a cutting disc rotated by a shaft extending into and terminating in the bowl, an improvement in said disc comprising, a peripheral flange thereon extending upwardly adjacent the bowl inner surface, a single substantially rectangular locking-edged opening through the disc and flange on one side only of the disc center and terminating short of and adjacent the center, a narrow slot centrally of the opening and extending across the disc center, a depending hub at the disc center and crossing said slot to receive the shaft therethrough, a removable locking-edged cutter insert having a tab matching said slot and radially slidable into said opening and slot to contact the hub, a stepped sleeve on said tab disposed on and vertically locating the insert on the shaft, whereby the disc is totally carried by the insert and vertically and radially restrained by the locked edges and shaft respectively, and fixedly spaced from the lid by said step for single disc multiple capability with different inserts.

2. Apparatus as described in claim 1 wherein said insert has an extension therethrough raised above the disc surface and a rim on the peripheral edge of the insert, said rim extending contiguous with and above the upward flange to form a guide to the aperture.

3. Apparatus as described in claim 2 wherein said locking edges are formed by matching bevels on said insert and disc.

4. Apparatus as described in claim 3 wherein said cutter insert has a scoop behind said cutter, and a second bevel at the end of said scoop to funnel cut food down into the bowl.

5. Apparatus as described in claim 4 having a U-shaped collar secured to said disc at said slot, said U opening toward said insert and formed to frictionally squeeze said tab to hold said insert in the disc.

6. Apparatus as described in claim 5 wherein all parts are plastic and the cutter blade is metallic secured to the insert on the scoop.

* * * * *